United States Patent Office 3,769,294
Patented Oct. 30, 1973

3,769,294
2-(2'-HYDROXY-5'-OCTYLPHENYL)
NAPHTHOTRIAZOLE
Sigmund C. Catino, Castleton, and Albert F. Strobel, Delmar, N.Y., assignors to GAF Corporation, New York, N.Y.
No Drawing. Continuation-in-part of abandoned application Ser. No. 504,206, Oct. 23, 1965. This application May 15, 1970, Ser. No. 37,904
Int. Cl. C07d 55/04
U.S. Cl. 260—308 B                 1 Claim

ABSTRACT OF THE DISCLOSURE

An organic composition stabilized against degradation due to ultraviolet light comprising an organic material normally subject to such degradation and a minor amount of an ultraviolet light absorbing compound of the formula:

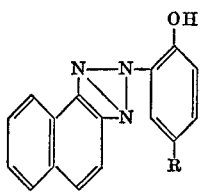

wherein R is an alkyl radical, preferably an alkyl radical of 1 to 8 carbon atoms.

---

This application is a continuation-in-part of co-pending application Ser. No. 504,206 filed Oct. 23, 1965, now abandoned.

The present invention relates to organic compositions normally subject to degradation by ultraviolet light, such composition containing a novel naphthotriazole ultraviolet light absorbing compound; more particularly, the present invention is directed to such composition and methods of protecting the same against the degradative effects of ultraviolet light wherein such compositions contain a minor amount of a naphthotriazole ultraviolet absorbing compound superior to previously developed ultraviolet absorbing agents, and the corresponding benzotriazoles, in particular.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultraviolet range. Such uses include incorporation in plastic sheet materials and the stabilization in general of transparent plastic bodies. By far, the greatest concern with respect to ultraviolet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degration caused by ultraviolet radiations. Many commercial products are either unstable when subjected to such radiations, or are effected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultraviolet light. It is well known that colored objects such as dyed textiles will fade on exposure to sunlight, and in particular to ultraviolet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

It has been discovered in accordance with the present invention that by combining certain hydroxy-substituted phenyl naphthotriazoles with organic materials subject to such degradation, compatible combinations with a vast number of film-forming plastics, resins, gums, waxes and the like result, which combinations further exhibit outstanding ultraviolet light absorbing properties within the generally encountered region of 250 to 400 millimicrons. The compounds with which the present invention is concerned, even though they exhibit outstanding absorbing properties close to the visible region of the electromagnetic field, nevertheless are essentially colorless compounds and can be employed with the assurance that they will not contribute to color in normally colorless formulations, nor will they effect the color of a colored formulation such as a paint, film or a dyed textile. In addition, it has been discovered in accordance with the present invention that the ultraviolet absorbing compounds employed in accordance with the compositions and process of the present invention are superior to conventional ultraviolet absorbing compounds, and, particularly the corresponding benzotriazoles.

It is accordingly a principal object of the present invention to provide certain novel compositions comprising an organic material normally susceptible to degradation by ultraviolet light containing an ultraviolet absorbing compound free from the disadvantages and deficiencies of previously employed materials and possessing outstanding properties for absorbing ultraviolet light in the harmful area of the spectrum.

It is a further object of the present invention to provide such compositions and methods of protecting the same from degradation wherein such compositions contain a hydroxy-substituted phenyl naphthotriazole ultraviolet light absorbing compound in an amount effective to prevent the degradation of the organic material.

Yet a further object of the present invention comprises such compositions and processes wherein the ultraviolet light absorbing compound comprises a 2-(2'-hydroxy-5'-alkylphenyl) - 2H - naphthotriazole and, preferably, 2-(2'-hydroxy-5'-methylphenyl)-2H-naphthotriazole.

Still further objects of the novel compositions and processes of the present invention will become more apparent from the following more detailed description of the present invention.

The ultraviolet light absorbing compounds employed in the compositions of the present invention and in accordance with the processes of the present invention are characterized by the following general formula:

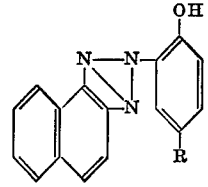

wherein R is an alkyl group of 1 to 30 carbon atoms, preferably an alkyl group of 1 to 8 carbon atoms.

In addition to the necessary alkyl and hydroxyl substituents on the phenyl ring, the phenyl ring may be optionally substituted with additional substituents which are non-chromophoric and non-auxochromic with a bathochromism of less than 250 A. Such additional substituents include such as halogen, preferably chlorine, carboxy, carbalkoxy, cyano, sulfamyl, carboxamido, etc. In addition, it is noted that the non-chromophoric and non-auxochromic optional substituent can comprise a substituted alkyl group such as hydroxyalkyl, haloalkyl, cyanoalkyl, alkoxyalkyl, and the like.

Additionally, it is noted that the naphthalene ring of the ultraviolet light absorbing compound may also be optionally substituted with suitable non-chromophoric and non-auxochromic substituents having a bathochromism of less than 250 A., i.e., substituents which do not in any way adversely effect the ultraviolet light absorption of the compound and, which do not in any way adversely effect the colorless characteristics of the same. Accordingly, the optional substituents which can be present on the naphthalene ring comprise those previously set forth with regard to the phenyl ring as well as the alkyl radicals suitable for R.

Accordingly, suitable alkyl substituents for R include such as:

methyl
ethyl
n-propyl
isopropyl
n-butyl
t-butyl
n-amyl
isoamyl
n-hexyl
isohexyl
n-octyl
isooctyl
t-octyl
nonyl
decyl
undecyl
dodecyl
tridecyl
tetradecyl
hexadecyl
octadecyl
eicosyl, and the like.

Again, it is preferred in accordance with the present invention that the alkyl substituents on the phenyl ring be an alkyl group of 1 to 8 carbon atoms. In this regard, it has been discovered further that still greater ultraviolet absorption is possessed by those naphthotriazole compounds in which R is methyl.

Additionally, the optional substituents on the phenyl or naphthyl rings in addition to the aforedescribed alkyl groups include such as:

substituted alkyls:
    cyanopropyl (n-propyl, isopropyl)
    cyanobutyl (n-butyl, isobutyl, etc.)
    cyanoamyl
    cyanohexyl
    cyanodecyl
    cyanolauryl, and the like
    hydroxethyl
    hydroxypropyl (n-propyl, isopropyl)
    hydroxybutyl (n-butyl, isobutyl, etc.)
    hydroxyamyl
    hydroxyhexyl
    hydroxydecyl
    hydroxylauryl, and the like
    chloroethyl
    chloropropyl (n-propyl, isopropyl)
    chlorobutyl (n-butyl, isobutyl, etc.)
    chloroamyl
    chlorohexyl
    chlorodecyl
    chlorolauryl, and the like
    bromoethyl
    bromopropyl (n-propyl, isopropyl)
    bromobutyl (n-butyl, isobutyl, etc.)
    bromoamyl
    bromohexyl
    bromodecyl
    bromolauryl, and the like
    methoxyethyl
    methoxypropyl (n-propyl, isopropyl)
    methoxybutyl (n-butyl, isobutyl, etc.)
    methoxyamyl
    methoxyhexyl
    methoxydecyl
    methoxylauryl, and the like
    ethoxyethyl
    ethoxypropyl (n-propyl, isopropyl)
    ethoxybutyl (n-butyl, isobutyl, etc.)
    ethoxyamyl
    ethoxyhexyl
    ethoxydecyl
    ethoxylauryl, and the like
    carbomethoxypropyl
    carbomethoxybutyl
    carbomethoxyamyl
    carbomethoxyhexyl
    carbethoxyethyl
    carbethoxypropyl
    carbethoxybutyl, etc.
    carbopropoxyethyl
    carbopropoxypropyl
    carbopropoxybutyl, etc.
    carbobutoxyethyl
    carbobutoxybutyl, etc.

substituted aryls:
    phenethyl
    tolyl
    p-ethoxyphenyl
    9-methoxy-10-phenanthryl
    4-methoxy-$\alpha$-naphthyl
    1-methoxy-$\beta$-naphthyl
    4-ethoxy-$\alpha$-naphthyl
    7-ethoxy-$\beta$-naphthyl
    hydroxyethyl phenyl
    hydroxypropyl phenyl
    4-hydroxyethyl-$\alpha$-naphthyl
    chlorophenyl
    bromophenyl
    2,4-dichlorophenyl
    2,5-dichlorophenyl
    2,4,6-trichlorophenyl
    2,5-dibromophenyl
    5-chloro-o-tolyl
    6-chloro-m-tolyl
    5-bromo-o-tolyl
    3-bromo-2,4-xylyl
    2,4-dichloro-$\alpha$-naphthyl
    4-bromoacenaphthyl
    carboxyphenyl
    carboxytolyls
    carboxyxylyl
    carbalkoxylphenyls, e.g., carbomethoxylphenyl, carboethoxyphenyl
    carbalkoxytolyls, e.g., carbomethoxytolyls
    acetophenyl
    propiophenyl
    butyrophenyl
    lauroylphenyl
    acetotolyl
    benzoyl naphthyl
    acetaminophenyl
    acet-methylamino phenyl
    acetaminotolyls
    acetoaminonaphthyls
    propio-aminophenyl
    propio-aminotolyls, and the like
    sulfamyl phenyl
    sulfamyl naphthyl
    N,N-dimethyl sulfamyl phenyl
    N,N-diethyl sulfamyl phenyl The compounds are prepared generally by diazotizing and coupling an orthoamino phenol to an amino naphthalene in such a manner that the coupling is ortho to the amino group of the naphtho ring. Thus, if the 4-position of the amino naphthalene is substituted, then a 1-amino naphthalene is employed, but if the 4-position is not substituted, then a 2-amino naphthalene is used. The resultant orthoamino azo compound is then oxidized in a conventional manner for forming triazole rings to produce the 2′-hydroxy phenyl naphthotriazole. A conventional oxidizing medium employs a cupric salt in pyridine solution.

Accordingly, specific naphthotriazole compounds useful as ultraviolet light absorbing agents in accordance with the novel compositions and processes of the present invention include such as:

(1) 2-(2′-hydroxy-5′-methyl phenyl)-2H-naphthotriazole
(2) 2-(2′-hydroxy-5′-methyl phenyl)-2H-(5-chloro-naphthotriazole)
(3) 2-(2′-hydroxy-5′-methyl phenyl)-2H-(5-methyl-naphthotriazole)
(4) 2-(2′-hydroxy-5′-methyl phenyl)-2H-(5-sulfamyl-naphthotriazole)
(5) 2-(2′-hydroxy-5′-methyl phenyl)-2H-(5-acetamido-naphthotriazole)
(6) 2-(2′-hydroxy-5′-methyl phenyl)-2H-(5-cyano-naphthotriazole)
(7) 2-(2′-hydroxy-5′-methyl phenyl)-2H-(5-carboethoxy-naphthotriazole)
(8) 2-(2′-hydroxy-5′-ethyl phenyl)-2H-naphthotriazole
(9) 2-(2′-hydroxy-5′-ethyl phenyl)-2H-(5-chloro-naphthotriazole)
(10) 2-(2′-hydroxy-5′-isopropyl phenyl)-2H-naphthotriazole
(11) 2-(2′-hydroxy-5′-butyl phenyl)-2H-naphthotriazole
(12) 2-(2′-hydroxy-5′-butyl phenyl)-2H-(5-cyano-naphthotriazole)
(13) 2-(2′-hydroxy-5′-hexyl phenyl)-2H-(5-methyl-naphthotriazole)
(14) 2-(2′-hydroxy-5′-octyl phenyl)-2H-naphthotriazole
(15) 2-(2′-hydroxy-5′-octyl phenyl)-2H-(5-methyl-naphthotriazole)
(16) 2-(2′-hydroxy-5′-octyl phenyl)-2H-(5-cyano-naphthotriazole)
(17) 2-(2′-hydroxy-5′-octyl phenyl)-2H-(5-carbomethoxynaphthotriazole)
(18) 2-(2′-hydroxy-5′-octyl phenyl)-2H-(5-sulfamyl-naphthotriazole)
(19) 2-(2′-hydroxy-5′-decyl phenyl)-2H-naphthotriazole
(20) 2-(2′-hydroxy-5′-dodecyl phenyl)-2H-naphthotriazole
(21) 2-(2′-hydroxy-5′-stearyl phenyl)-2H-naphthotriazole
(22) 2-(2′-hydroxy-5′-eicosyl phenyl)-2H-naphthotriazole As indicated previously, the above naphthotriazole derivatives are employed in the compositions of the present invention in order to prevent the ultraviolet degradation of organic materials normally subject to such degradation when irradiated with ultraviolet light. In this respect, the compounds of the present invention are soluble in many diverse types of polymers, resins, waxes and the like, and therefore they are particularly suitable and adaptable for the stabilization of such materials.

The ultraviolet absorbing compounds of the present invention may be used to stabilize all organic materials which are susceptible to ultraviolet light degradation and are particularly useful in the stabilization of resins and plastics, whether they be in the form of films or molded products, and whether clear, opaque, semi-opaque, or translucent. Plastic forms, fibers and the like are also admirably protected. Suitable plastic materials include, for example, polyolefins, e.g., polyethylene and polypropylene; polyvinylchloride; polyamides, polyesters, etc. Pigments, polishes, creams, lotions, pharmaceutical and cosmetic compositions, paints, enamels, varnishes, dyestuffs, wood, leather, silk, tobacco products and the like may likewise be protected against the degradative effects of actinic radiations. The amount of stabilizer to be incorporated into such compositions is not critical except that a sufficient amount should be used to obtain the desired results. In general, between about 0.1% and 10% by weight of absorber based upon the weight of organic material to be protected gives admirable stabilization.

In accordance with the process of the present invention any and all of the foregoing organic materials are protected from degradation due to ultraviolet light by incorporation within the same an effective amount of the foregoing ultraviolet light absorbing agents. In this regard, it has been discovered in accordance with the present invention that the incorporation of a minor but effective amount of the foregoing naphthotriazole ultraviolet absorbing agent into an organic composition normally susceptible to ultraviolet light degradation substantially prevents or eliminates such harmful effects associated with exposure. In this regard, the naphthotriazole ultraviolet light absorbing agents employed in accordance with the present invention have been found to provide superior protection when compared for example with the corresponding benzotriazole compounds and an ultraviolet light absorbing compound recognized as being the best available in the art.

The novel compositions and process of the present invention will now be illustrated by reference to the following specific examples. It should be recognized, however, that such examples are presented for purposes of illustration only and the present invention is in no way to be deemed as limited thereto.

EXAMPLE 1

Preparation of: 2-(2′-hydroxy-5′-methylphenyl)-2H-naphthotriazole (A) Preparation of azo intermediate.—Into a 4-liter beaker (immersed in an ice bath) there are charged:

71.6 g. of 100% 4-methyl-2-aminophenol (M.W. 123)
320 ml. water
320 g. ice
120 ml. hydrochloric acid (38% C.P.)

The mixture is stirred for 10 minutes at 5° C. and there is then added at 5°–10° C., dropwise 106 ml. of a 38.5% aqueous solution of sodium nitrite. Stirring is continued for 15 minutes at 10° C. and the excess nitrite is destroyed with 9 cc. of 10% aqueous sulfamic acid. There are then added:

91.4 g. 2-naphthylamine
250 ml. glacial acetic acid, and then
800 ml. of water to dilute the slurry.

There is then added slowly 170 g. of sodium acetate crystals until neutral to Congo (pH 4.5). The azo precipitate is filtered and washed with 2000 ml. of water and dried in a vacuum at 40° C. The yield is 197 g.

(B) Preparation of triazole.—Into a 5-liter, 3-necked flask equipped with a stirrer, thermometer, reflux condenser and heating mantle, there are charged:

197 g. of azo dye from (A) and
1400 ml. picoline

The mixture is heated at 95° C. with stirring to effect solution. Then there are added:

384 g. of copper sulfate .5 $H_2O$ and
1400 ml. picoline.

Stirring is continued for ½ hour at 105° C.–110° C. and then at 90° C.–100° C., there are added:

180 g. sodium sulfide .2 ½ $H_2O$ flakes dissolved in 360 ml. water at 50° C.

Stirring is continued for ½ hour at 105° C.–110° C. tion mixture then clarified and washed with 500 ml. of hot picoline. The filtrate is then diluted with 3400 ml. of water, stirred and filtered. The filter cake is washed with 1200 ml. of 1:1 picoline-water, water, and finally with 4000 ml. of warm water. The product is recrystallized from 3600 ml. of methyl Cellosolve (ethylene glycol mono methyl ether) to give a pure product with a $K_{max}=75$ at 348 m$\mu$.

EXAMPLE 2

The pure product of Example 1 is tested in a polyester-styrene composition (Polylite 8000) at a concentration of 0.25% and 0.5%. Discs of the resin ⅛" thick and 1½" in diameter are fabricated. After 500 hours exposure in a fadeometer there is no discernible break (visible evidence of degradation) with the discs containing 0.25%. A similar disc without any stabilizer discolored badly after 100 hours. At a concentration of 0.50% there is no break after 600 hours exposure.

The resin samples are prepared by casting between glass plates and curing in an oven by placing the castings in the oven at 65° C. and raising the temperature to 125° C. and holding at this temperature for one hour. The resin consists of 30% styrene and 70% glyceryl phthalate maleate containing 0.5 g. of benzoyl peroxide dissolved in 0.5 g. of tricresyl phosphate.

EXAMPLE 3

Example 1 is once again repeated except that the following aminophenols are used, in equivalent amounts, in place of 4-methyl-2-aminophenol:

(A) 2-amino-4-methyl-5-chlorophenol
(B) 2-amino-4-methyl-5-cyanophenol
(C) 2-amino-4-methyl-5-acetamidophenol
(D) 2-amino-4,5-dimethylphenol
(E) 2-amino-4-ethyl phenol
(F) 2-amino-4-butyl-5-cyanophenol
(G) 2-amino-4-octyl-5-methylphenol
(H) 2-amino-4-octylphenol
(I) 2-amino-4-decylphenol
(J) 2-amino-4-stearylphenol

EXAMPLE 4

Example 1 is further repeated using the following amino-naphthalenes, in equivalent amounts, in place of 2-naphthylamine:

(A) 1-amino-4-methyl naphthalene
(B) 1-amino-4-dimethylsulfamyl naphthalene
(C) 1-amino-4-cyanonaphthalene
(D) 1-amino-4-methoxy naphthalene
(E) 1-amino-4-acetamido naphthalene
(F) 1-amino-4-carbomethoxy naphthalene.

EXAMPLE 5

The products of Example 3(A), 3(D), 3(H), 4(A), and 4(C) are tested as in Example 2 and give excellent results.

EXAMPLE 6

The product of Example 1 is further tested in a polyvinyl chloride resin formulation as follows. 0.25% of the product of Example 1 is incorporated by milling into a formulation which consists of:

100 parts polyvinyl chloride,
25 parts dioctyl phthalate, and
25 parts of Santicizer 160 (a commercial plasticizer of Monsanto Chemical Company).

The milled mixture is then pressed out in a Carver press to a 10 mil thickness and the resultant film is then exposed in a fadeometer for 500 hours. A similar film is prepared and exposed but containing no absorber. The latter develops a considerable number of black specks after the indicated exposure time whereas the other film is substantially unchanged.

EXAMPLE 7

Example 6 is repeated employing, in place of the product of Example 1, the following products:

(A) The products of Example 3(A), 3(C), 3(D) and 3(F).
(B) The products of Example 4(A), 4(B) and 4(D).

The results are comparable to those of Example 6.

EXAMPLE 8

The product of Example 1 is employed to stabilize polyethylene as follows:

A high density polyethylene (high density Fortiflex A–70) is heated to 120° C. on a two-roller mill. To the resultant melt there is added 0.25% by weight of the product of Example 1. The melted mixture is kneaded for 5 mintues, cooled, then pressed on a Carver press at 110° C. to form a disc 6 mils in thickness. A similar disc is prepared without any absorber and both are exposed in a fadeometer for 100 hours. Infra-red measurements are taken on both samples to indicate the presence of carbonyl formation (which is a measure of polyethylene degradation). The sample containing the absorber shows practically no carbonyl groups present whereas the unstabilized sample shows the formation of a considerable amount of carbonyl development.

EXAMPLE 9

Example 8 is repeated employing, however, in place of the product of Example 1, the following products:

(A) The products of Example 3(A) and 3(H).
(B) The product of Example 4(A).

In each instance the polyethylene containing the absorber shows the development of less carbonyl groups than the unstabilized sample.

EXAMPLE 10

To a polystyrene molding powder (Monsanto Lustrex Hi-Flow 55) in a Banbury mixer heated to 200° C. under nitrogen, there is added 0.25% by weight based on the weight of the polystyrene of the product of Example 1. The mixture is kneaded to a clear solution for 1 hour, then discharged and pressed in a Carver press at 200° C. to make a 6 mil disk. This sample, along with a similar one containing no stabilizer, is exposed for 100 hours in a fadeometer. The stabilized sample shows no change after this exposure while the unstabilized disc, i.e. free from the absorber, shows a distinct yellowing thereof.

EXAMPLE 11

In order to illustrate the superior effectiveness of the naphthotriazole ultraviolet light absorbing compounds in accordance with the present invention the compound 2-(2'-hydroxy-5'-methyl phenyl)-2H-naphthotriazole was tested against the corresponding benzotriazole compound such as illustrated for example in French Pat. 1,324,889. To substantiate the unexpected properties of the novel compositions of the present invention the following experiment was conducted:

A cellulose acetate film was prepared by mixing

| | G. |
|---|---|
| Methoxyethanol | 29 |
| Ethyl acetate | 38 |
| Ethyl alcohol | 14.5 |
| Triphenyl phosphate | 3.75 |
| Cellulose acetate | 15 |

Into a batch of the above 4% by weight of the ultraviolet absorbing agent was incorporated and the composition drawn into a film, 1 mil. in thickness utilizing a Bird applicator. The ultraviolet light absorbing agent corresponding to that of the present invention had the following formula:

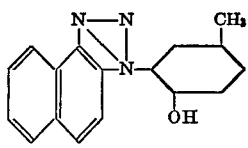

The ultraviolet light absorbing agent typifying the corresponding benzotriazole compounds had the following formula:

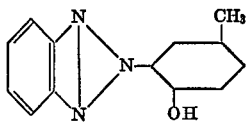

This is a commercial product sold as Tinuvin P, recognized in the art as being one of the best available ultraviolet light absorbing agents.

On the basis of one pound of dyestuff per 100 pounds of paper pulp, paper sheets were reared and exposed for one hour under a carbon arc standard fadeometer.

Using methylene blue A Ex conc. (CI 52015) as the dye-stuff the paper was exposed in the standard fadeometer test through the collulose acetate film containing the naphthotriazole ultraviolet light absorbing agent of the present invention and Tinuvin P, the commercial ultraviolet light absorber corresponding to the benzotriazole of the prior art.

As a result of the experiment the sample under the Tinuvin P film showed considerably more loss of blue with attendant darkening of the dyestuff under the film than the film containing the naphthotriazole ultraviolet light absorber of the present invention. Accordingly, this establishes that the naphthotriazole ultraviolet light absorbers employed in the compositions of the present invention provide for superior prevention of degradation even when compared with the corresponding benzotriazole compounds considered to be the best available commercial ultraviolet light absorbing agents.

EXAMPLE 12

Utilizing the same benzotriazoles and naphthotriazole ultraviolet light absorbers as set forth in Example 11 a further comparative example was conducted in order to illustrate the superiority of the compositions of the present invention containing the naphthotriazole ultraviolet light absorbing agent.

Cellulose acetate films were prepared as in Example 11, such films being used overlaying Dacron #64 dyed in ¼% dyes with Genacryl blue 6G (CI 42025) and Genacryl red 4B (CI 48013).

The dyes overlaid with the film containing the ultraviolet light absorbing agent was exposed for ten hours under a carbon arc standard fadeometer, it being noted that with respect to the Genacryl blue 6G dyes two layers of cellulose acetate film were employed in that each contained only 2% of the benzotriazole or naphthotriazole ultraviolet light absorbing agent.

With respect to the blue dyeing, after ten hours of exposure, the dyestuff under the commercial benzotriazole-containing cellulose acetate film had deteriorated and darkened considerably more than the same dyeing under the cellulose acetate film containing the instant naphthotriazole ultraviolet light absorbing agent.

In the case of the red dyeing, the dyed fabric under the cellulose acetate film containing the commercial benzotriazole ultraviolet light absorbing agent lost considerably more red through deterioration and, accordingly, showed more fading than the same dyeing overlaid with the film containing the naphthotriazole ultraviolet absorbing agent.

Here again, therefore, this clearly illustrates the unexpected superiority of the naphthotriazole ultraviolet light absorbing agents used in accordance with the composition and process of the present invention.

EXAMPLE 13

Utilizing the same benzotriazole and naphthotriazoles as in Example 11 a further comparative experiment was conducted.

This experiment was conducted in order to illustrate the ability of the naphthotriazole ultraviolet light absorber of the present invention to reduce the yellowing associated with the employment of phenylmethylpyrazolone, a commonly employed developer in color photography and a common cause of yellowing of photographic film on exposure to light.

In accordance with this experiment 1% phenylmethylpyrazolone was incorporated into a cellulose acetate film prepared as in Example 11 with two other films containing 5% (o.w. cellulose acetate) of Tinuvin P, the commercial benzotriazole ultraviolet light absorber, and the naphthotriazole ultraviolet light absorber of the present invention, i.e., 2 - (2' - hydroxy-5'-methyl phenyl) - 2H-naphthotriazole.

The film containing the phenylmethylpyrazolone was exposed for ten hours in a standard fadeometer test with no overlaying film containing an ultraviolet light absorber and with films containing the above-described benzotriazole and naphthotriazole compounds.

As a result of this experiment, there was considerably less decomposition, i.e., yellowing, in the case of the utilization of the naphthotriazole ultraviolet light absorber than when the commercial benzotriazole absorber was utilized. The blank showed the greatest degree of decomposition.

EXAMPLE 14

A further experiment was conducted utilizing the same ultraviolet light absorbing agents of Example 11 to further illustrate the superiority of the naphthotriazole over the benzotriazole, considered to be one of the best available commercial ultraviolet light absorbing agents.

Some 0.1 gram Fluorol 7GA (CI fluorescent Brightening Agent 75) was well mixed with 10 cc. methanol, 15 cc. NC thinner, and 40 grams nitrocellulose lacquer. Such a composition was then coated on white clay coated paper and exposed for two minutes in a standard fadeometer under cellulose acetate films, one being blank, one containing 2% Tinuvin P, and the last containing 2% of 2-(2'-hydroxy-5'-methyl phenyl)-2H-naphthotriazole.

As a result of this experiment, it was observed that deterioration, as shown by darkening of color, was much less pronounced when the dye or brightening agent was exposed to ultraviolet light under a film containing the naphthotriazole ultraviolet light absorber of the present invention than a similar dyeing overlaid with a cellulose acetate film containing the best commercially available benzotriazole ultraviolet light absorber. Again, deterioration was most pronounced in the blank.

The above examples clearly illustrate the utility and, in fact, superiority of the naphthotriazole ultraviolet light absorbing agents of the present invention to prevent the degradation of organic material normally susceptible to degradation due to ultraviolet light. In this regard, the compositions of the present invention generally comprise such an organic material normally susceptible to degradation containing in an amount effective to prevent such degradation of a substantially colorless ultraviolet light absorbing compound capable of absorbing ultraviolet light within the region of 250 to 400 millimicrons. In this regard, such ultraviolet light absorbing compounds in accordance with the present invention comprise 2-(2'-hydroxy-5'-alkyl phenyl)-2H-naphthotriazoles and substituted derivatives thereof wherein the substituents are selected from non-chromophoric and non-auxochromic groups with a bathochromism of less than 250 A.

Additionally, the present invention relates to a method of preventing the ultraviolet light degradation of an organic material normally susceptible thereto by incorporating in the organic material an effective ultraviolet light absorbing amount of the aforedescribed substantially colorless ultraviolet light absorbing compounds capable of absorbing ultraviolet light within the wave length region of 250 to 400 microns. In general, while the amount of ultraviolet light absorber effective to prevent the degradation is not particularly critical, the same is generally employed in the organic composition in an amount between 0.01% and 10% by weight based upon the solids content of the organic material, preferably in an amount of between 0.5% to about 2% by weight.

In addition to those materials which have been specifically shown as stabilized, other organic substrates may be employed. These include the general class of vinyl polymers such as polyvinyl acetate, polyvinyl chloride-acetate, polyvinyl butyrate, acrylate polymers such as methyl methacrylate, polyolefins in addition to polyethylene such as polypropylene, polyamides such as those derived from caprolactam (nylon 6), nylons produced by the condensation of di-basic acids and polyamines such as hexamethylene diamine and adipic acid (nylon 66), as well as other polyamides, polyoxyalkylenes such as polyformaldehyde and the like, cellulose esters such as cellulose acetate, cellulose propionate, cellulose butyrate, cellulose acetate-butyrate, and the like, cellulose ethers, polyurethane resins, and the like. In addition to the use of the above described polymeric materials in film form to effect the stabilization thereof, such substrates may be similarly protected in the form of molded articles, fibers, foils, and the like, and in addition, such materials may contain the usual fillers, plasticizers, pigments, dyestuffs and other conventional modifiers and additives used therewith. In addition to the resinous materials which are admirably protected by the compounds herein disclosed, other organic materials, and particularly those which are subjected to degradative action by ultraviolet light may also be protected. These include such materials as oil, fats, papers, waxes (natural or synthetic), cellulose in any form, dyestuffs, pigments, and any liquid or solid organic material which is affected by ultraviolet light. Still further, the compounds of this invention are admirably suited for application as surface coatings or impregnants in addition to their use by incorporation into the substrate to be protected. In addition to the usual surface coatings, the compositions of the present invention are highly effective for protecting the human skin, paricularly against the burning rays of the sun, and for such use the absorbers may be applied to the skin in any suitable carrier which may be aqueous or non-aqueous, and may contain any desirable film-forming material. The use of aerosol preparations using the conventional propellant combinations is excellently suited for such purposes.

While various embodiments of the present invention have been illustrated by way of specific example, it is to be understood that the present invention is in no way deemed as being limited thereto but must be construed as broadly as any and all equivalents thereof.

What is claimed is:

1. A substantially colorless ultraviolet light absorbing compound of the formula:

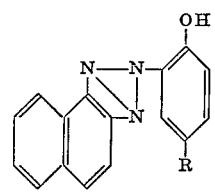

wherein R is octyl.

References Cited

UNITED STATES PATENTS 3,230,194    1/1966    Boyle _____ 260—308

FOREIGN PATENTS 878,362    9/1961    Great Britain _____ 260—308

OTHER REFERENCES

Chmátal et al.: Collection Czechoslov. Chem. Communs., vol. 26, pp. 67–78 (1961).

Ferreri: Gazz. Chim. ital., vol. 44, pp. 632–641 (1914).

ALTON D. ROLLINS, Primary Examiner

U.S. Cl. XR.

106—176; 117—33.3; 252—300; 260—45.8 N, 196, 465 E, 556 B, 562 A, 575; 424—59